United States Patent
Stock et al.

(12)

(10) Patent No.: US 11,986,811 B2
(45) Date of Patent: May 21, 2024

(54) EXHAUST GAS AFTERTREATMENT DEVICE

(71) Applicant: Vitesco Technologies GMBH, Regensburg (DE)

(72) Inventors: Holger Stock, Siegburg (DE); Philipp Langenfeld, Rösrath (DE); Peter Hirth, Rösrath (DE); Erwin Achleitner, Obertraubling (DE); Gerhard Haft, Maxhütte-Haidhof (DE); Florian Kleiner, Kehlheim (DE); Paul Rodatz, Landshut (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 17/552,936

(22) Filed: Dec. 16, 2021

(65) Prior Publication Data

US 2022/0105503 A1 Apr. 7, 2022

Related U.S. Application Data

(63) Continuation of application No. PCT/EP2020/067586, filed on Jun. 24, 2020.

(30) Foreign Application Priority Data

Jun. 26, 2019 (DE) ...................... 10 2019 209 304.3

(51) Int. Cl.
*B01J 35/04* (2006.01)
*B01D 53/94* (2006.01)
(Continued)

(52) U.S. Cl.
CPC .......... *B01J 35/00* (2013.01); *B01D 53/9481* (2013.01); *B01J 19/0013* (2013.01);
(Continued)

(58) Field of Classification Search
CPC ........ B01D 53/00; B01D 53/34; B01D 53/92; B01D 53/94; B01D 53/9481;
(Continued)

(56) References Cited

U.S. PATENT DOCUMENTS 5,098,670 A 3/1992 Haerle
5,582,805 A 12/1996 Fujishiro
(Continued)

FOREIGN PATENT DOCUMENTS

DE 4419776 A1 1/1995
DE 19851976 A1 5/2000
(Continued)

OTHER PUBLICATIONS

International Search Report and Written Opinion dated Jul. 27, 2020 from corresponding International Patent Application No. PCT/EP2020/067586.
(Continued)

*Primary Examiner* — Natasha E Young

(57) ABSTRACT

A device for the aftertreatment of exhaust gases from an exhaust-gas source, having a spatially delimited flow path through which flow may pass proceeding from the exhaust-gas source, having a heating catalytic converter which is arranged in the flow path and which, as viewed in a flow direction, firstly has a catalytically active catalytic converter through which flow may pass and, following this in the flow direction, has an electrically heatable heating disk, wherein at least one outlet of a secondary air supply is arranged in the region of the heating catalytic converter such that a gas flow referred to as secondary air is fed into the flow path in the region of the heating catalytic converter.

8 Claims, 2 Drawing Sheets

(51) Int. Cl.
*B01J 19/00* (2006.01)
*B01J 35/00* (2006.01)
*F01N 3/20* (2006.01)
*F01N 3/28* (2006.01)
*F01N 3/30* (2006.01)

(52) U.S. Cl.
CPC .............. *B01D 2255/9155* (2013.01); *B01J 2219/00132* (2013.01); *F01N 3/2013* (2013.01); *F01N 3/2803* (2013.01); *F01N 3/30* (2013.01)

(58) Field of Classification Search
CPC ............ B01D 2255/00; B01D 2255/90; B01D 2255/915; B01D 2255/9155; B01J 19/00; B01J 19/0006; B01J 19/0013; B01J 35/00; B01J 35/02; B01J 35/04; B01J 2219/00; B01J 2219/00049; B01J 2219/00051; B01J 2219/00132
See application file for complete search history.

(56) References Cited

U.S. PATENT DOCUMENTS

| | | | |
|---|---|---|---|
| 5,634,331 A | 6/1997 | Aoki et al. | |
| 5,651,906 A * | 7/1997 | Whittenberger | F01N 3/2814 422/174 |
| 5,814,283 A | 9/1998 | Matuoka et al. | |
| 5,850,734 A | 12/1998 | Ketcham | |
| 6,446,431 B1 | 9/2002 | Brück | |
| 6,513,324 B2 * | 2/2003 | Bruck | F01N 3/2026 422/177 |
| 6,641,795 B2 * | 11/2003 | Abe | B01J 12/007 423/655 |
| 7,261,865 B2 | 8/2007 | Brück | |
| 8,668,876 B2 * | 3/2014 | Bruck | F01N 3/2026 219/520 |
| 9,371,760 B2 * | 6/2016 | Hirth | F01N 9/00 |
| 11,220,942 B2 * | 1/2022 | Hupfeld | F01N 3/101 |
| 2003/0161766 A1 | 9/2003 | Bruck | |
| 2006/0191982 A1 | 8/2006 | Bruck | |
| 2018/0291784 A1 | 10/2018 | Achenback et al. | |
| 2022/0235684 A1 * | 7/2022 | Zhang | F02D 41/0255 |

FOREIGN PATENT DOCUMENTS

| | | | |
|---|---|---|---|
| DE | 102015200023 A1 | 7/2015 | |
| JP | S60183764 U | 9/1985 | |
| JP | 02126015 A | 5/1990 | |
| JP | H05187228 A | 7/1993 | |
| JP | H06336915 A | 12/1994 | |
| JP | H07238823 A | 9/1995 | |
| JP | H1034487 A | 2/1998 | |
| JP | H10121949 A | 5/1998 | |
| JP | 2015029928 A5 | 9/2015 | |
| WO | 0112961 A1 | 2/2001 | |
| WO | 2004047952 A2 | 6/2004 | |
| WO | WO-2018234141 A1 * | 12/2018 | B01D 53/9454 |

OTHER PUBLICATIONS

Japanese Office Action dated Jan. 23, 2023 for corresponding Japanese Patent Application No. 2021-576953.
Chinese Office Action dated Jul. 22, 2023 for corresponding Chinese Patent Application No. 202080045839.0.

* cited by examiner

EXHAUST GAS AFTERTREATMENT DEVICE

CROSS-REFERENCE TO RELATED APPLICATIONS

This application claims priority to PCT Application PCT/EP2020/067586, filed Jun. 24, 2020, which claims priority to German Patent Application No. DE 10 2019 209 304.3, filed Jun. 26, 2019. The disclosures of the above applications are incorporated herein by reference.

FIELD OF THE INVENTION

The invention relates to a device for the aftertreatment of exhaust gases from an exhaust-gas source, having a spatially delimited flow path through which flow may pass proceeding from the exhaust-gas source, having a heating catalytic converter which is arranged in the flow path and which, as viewed in a flow direction, firstly has a catalytically active catalytic converter through which flow may pass and, following this in the flow direction, has an electrically heatable heating disk.

BACKGROUND OF THE INVENTION

To improve exhaust-gas aftertreatment, electrically heatable catalytic converters are used to increase the exhaust-gas temperature and thus to be able to ensure more rapidly effective exhaust-gas aftertreatment, in particular after the cold start of an internal combustion engine.

Systems known from the prior art are generally constructed such that, in a flow direction of the exhaust gas, there is firstly installed a heating disk, which is composed for example of a metallic honeycomb body that has an electrical heating conductor, followed by a so-called supporting catalytic converter, to which the heating disk is mechanically connected. The supporting catalytic converter and the catalytic converters that may follow in the flow direction are provided for the actual aftertreatment of the exhaust gas, whereas the heating disk is used substantially for warming the exhaust gas.

Systems are also known which have a catalytic converter, through which flow may pass, already upstream of the heating disk as viewed in the flow direction.

A particular disadvantage of the known devices is that it is not possible to achieve optimum chemical reaction of the exhaust gases on the different catalytic converters, because either the arrangement of the catalytic converters is not optimal or the respective orientation of the catalytic converters is not optimal.

SUMMARY OF THE INVENTION

The problem addressed by the present invention is therefore that of creating a device for exhaust-gas aftertreatment which has an optimized construction with regard to exhaust-gas aftertreatment and which thus allows optimal aftertreatment of the exhaust gas, that is to say a chemical reaction of the pollutants contained in the exhaust gas, in all operating situations.

The object relating to the device is achieved by a device having the features described herein.

One exemplary embodiment of the invention relates to a device for the aftertreatment of exhaust gases from an exhaust-gas source, having a spatially delimited flow path through which flow may pass proceeding from the exhaust-gas source, having a heating catalytic converter which is arranged in the flow path and which, as viewed in a flow direction, firstly has a catalytically active catalytic converter through which flow may pass and, following this in the flow direction, has an electrically heatable heating disk, wherein at least one outlet of a secondary air supply is arranged in the region of the heating catalytic converter such that a gas flow referred to as secondary air is fed into the flow path in the region of the heating catalytic converter.

Exhaust-gas sources are for example internal combustion engines for driving motor vehicles. The device may be used irrespective of the fuel used in the exhaust-gas source.

In the device according to the invention, the basically known heating catalytic converter, which has a heating disk and a catalytic converter, is arranged in the flow path in a configuration rotated through 180 degrees. This, in conjunction with the injection of the secondary air, has the effect that the pollutants stored in the heating catalytic converter, which are stored for example in that part of the catalytic converter which has an adsorbent layer, are not desorbed before the light-off temperature of the heating disk or of a main catalytic converter following the heating catalytic converter is attained and pass to the heating disk and/or the main catalytic converter. This would result in an incomplete reaction or an absence of a reaction of these pollutants.

The catalytic converter present in the heating catalytic converter may perform several functions and be constructed in a wide variety of different ways. Aside from a ceramic honeycomb body, a metallic honeycomb body may also form the basis of the catalytic converter. By using different coatings, the catalytic converter may be configured for the aftertreatment of different pollutants in the exhaust gas.

Secondary air refers to air from the surroundings of the exhaust-gas source. This is explicitly not a gas mixture generated by the combustion. The air may be injected by a suitable delivery system which has, for example, a pump and a metering device.

The heating disk may be formed by a coated and/or uncoated honeycomb body. An electrical heating conductor may be wound into the honeycomb structure of the heating disk or connected to the honeycomb structure on the inflow side or on the outflow side.

The heating disk may for example also be formed by a ceramic matrix which has a metallic coating. The coating may be connected to a voltage source, and a heating action is generated using the electrical resistance. Metallic materials may also be extruded into such a ceramic matrix in order to then act as heating devices in conjunction with a voltage source.

In an embodiment, the catalytic converter is configured as a metallic honeycomb body. The catalytic converter and/or the heating disk may both be configured in each case as a metallic honeycomb body or as a ceramic matrix. A combination of a metallic honeycomb body and a ceramic matrix may also be provided.

It is furthermore expedient if the heating disk is mechanically connected to the catalytic converter, wherein the catalytic converter acts as a supporting catalytic converter. In order to be able to position the heating disk securely within the flow path, the heating disk is supported with respect to the supporting catalytic converter using mechanical supporting components, for example pins that are inserted into the honeycomb body.

A supporting catalytic converter is thus a special configuration of a catalytic converter, which is characterized in an embodiment by the fact that the downstream heating disk is mechanically supported with respect to the supporting catalytic converter and is thus positionally fixed in the flow path relative to the supporting catalytic converter. In one exemplary embodiment, the heating disk could for example also be fixed relative to the catalytic converter by using a jacket surrounding both elements.

In an embodiment, the secondary air is supplied into the flow path between the catalytic converter and the heating disk.

The secondary air is, in an embodiment, injected downstream of the catalytic converter, or at least only downstream of that section of the catalytic converter to which an adsorbent coating is applied, in the flow direction, so as to prevent the secondary air, which is basically not laden with pollutants, from desorbing the pollutants that are possibly already bound in the adsorbent section of the catalytic converter.

In an embodiment, the secondary air supply takes place via multiple feed points. The injection via multiple feed points obtains the most uniform possible distribution of the secondary air over the flow cross section. For this purpose, it is for example possible for multiple feed points to be provided over the circumference of the wall that delimits the flow path, via which feed points the secondary air is supplied. These may for example be nozzles or simply slots that allow the secondary air to be fed into the flow path from the outside.

An exemplary embodiment is characterized in that the heating conductor is arranged on or in the heating disk and is designed such that one or more local temperature maxima is generated, wherein the positions of the temperature maxima on the heating disk correlate with the positions of flow maxima of the secondary air that are generated as a result of the feed of the secondary air.

For this purpose, it is possible in an embodiment for the arrangement of the heating conductor to be adapted accordingly. For example, the heating conductor may be laid in loops or laid in doubled fashion in certain regions in order to realize increased heating power there. Likewise, the material of the heating conductor may be adapted such that, in certain regions, higher heating power is achieved for example owing to higher ohmic resistances.

The arrangement of the feed points will result in flow maxima for the secondary air that are distributed over the cross section. In order to achieve uniform and the most rapid possible heating of the entire gas flow composed of exhaust gas and secondary air, in an embodiment, there is increased heating power in the regions of the flow maxima of the secondary air.

In an embodiment, the secondary air supply takes place into at least one cavity formed in the honeycomb body of the catalytic converter.

In an embodiment the honeycomb body of the catalytic converter is coated with an adsorbent coating from its inflow side to the cavity in the flow direction, wherein the honeycomb body is coated with an oxidizing coating from the cavity to the outflow side. This allows the adsorption of pollutants in a region of the catalytic converter which is not impinged on by the secondary air. If the secondary air were fed in already in or upstream of the region, an undesired and premature desorption of the adsorbed pollutants could otherwise occur. In this way, pollutants are absorbed at least in a limited region and, at the same time, a feed of secondary air may take place within the catalytic converter.

In an embodiment, as viewed in the flow direction, the cavity is arranged in a region between the center and the outflow side of the catalytic converter. The further downstream the cavity is arranged as viewed in the flow direction, the longer the region of the catalytic converter that is used for the adsorption of pollutants may be.

It is also expedient if the corrugated layers and smooth layers that form the catalytic converter are of perforated form downstream of the at least one cavity as viewed in the flow direction. This promotes the mixing of the secondary air with the exhaust-gas flow across the cross-sectional area and thus allows an altogether more homogeneous flow.

In an embodiment, the corrugated layers and smooth layers that form the catalytic converter are formed as expanded metal downstream of the at least one cavity as viewed in the flow direction. Expanded metal refers to a metal with a mesh-like structure, which has a multiplicity of openings, thus allowing a transfer flow between the individual flow channels.

Additional developments of the present invention are described in the following description of the Figures.

BRIEF DESCRIPTION OF THE DRAWINGS

The invention will be discussed in more detail below on the basis of exemplary embodiments with reference to the drawings. In the drawings.

DETAILED DESCRIPTION OF THE PREFERRED EMBODIMENTS

The following description of the preferred embodiment(s) is merely exemplary in nature and is in no way intended to limit the invention, its application, or uses.

Figure 1:
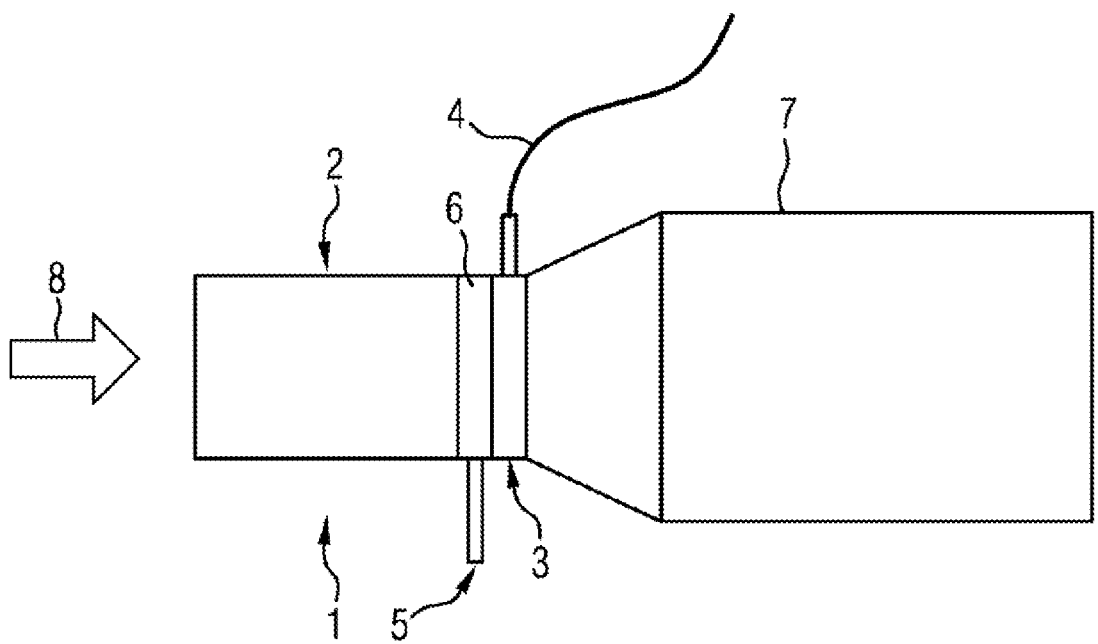
FIG. 1 shows a schematic view of a device having a heating catalytic converter, having a secondary air supply and having a main catalytic converter.
Figure 2:
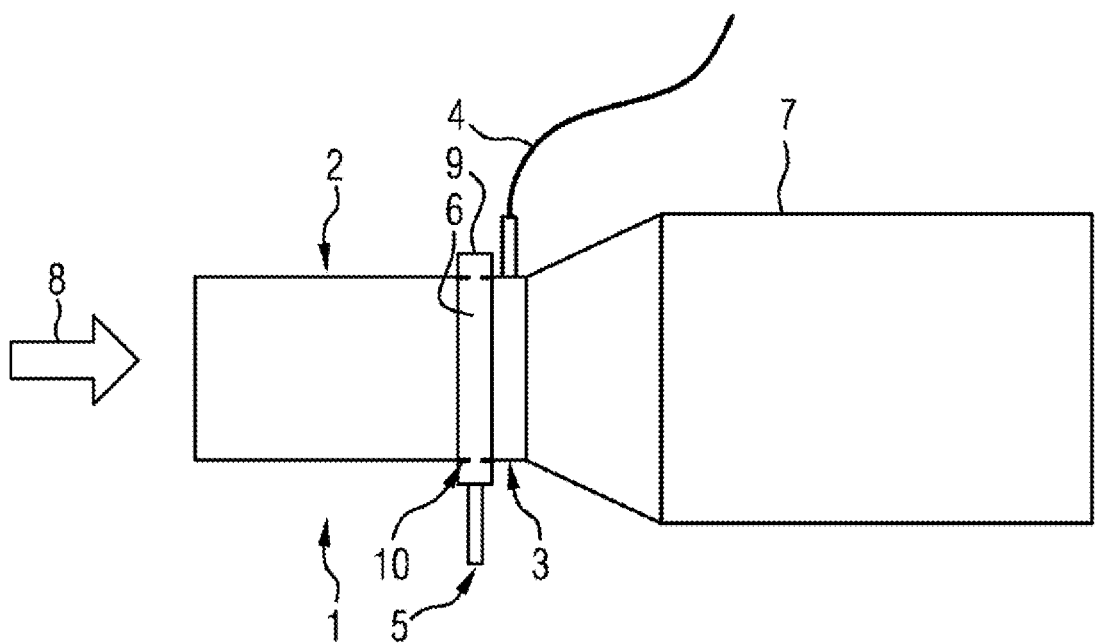
FIG. 2 shows a schematic view of a device having a heating catalytic converter, having a secondary air supply that allows secondary air to be supplied at multiple points along the circumference of the flow path, and having a main catalytic converter.
Figure 3:
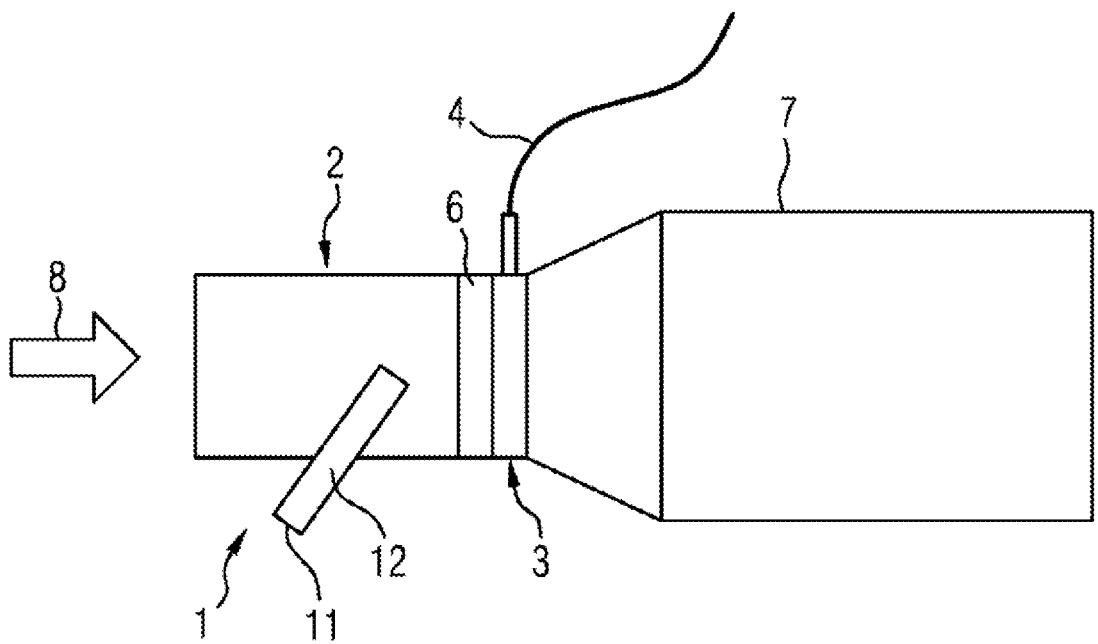
FIG. 3 shows a schematic view of a device having a heating catalytic converter, having a secondary air supply into a cavity of the catalytic converter, and having a main catalytic converter.
Figure 4:
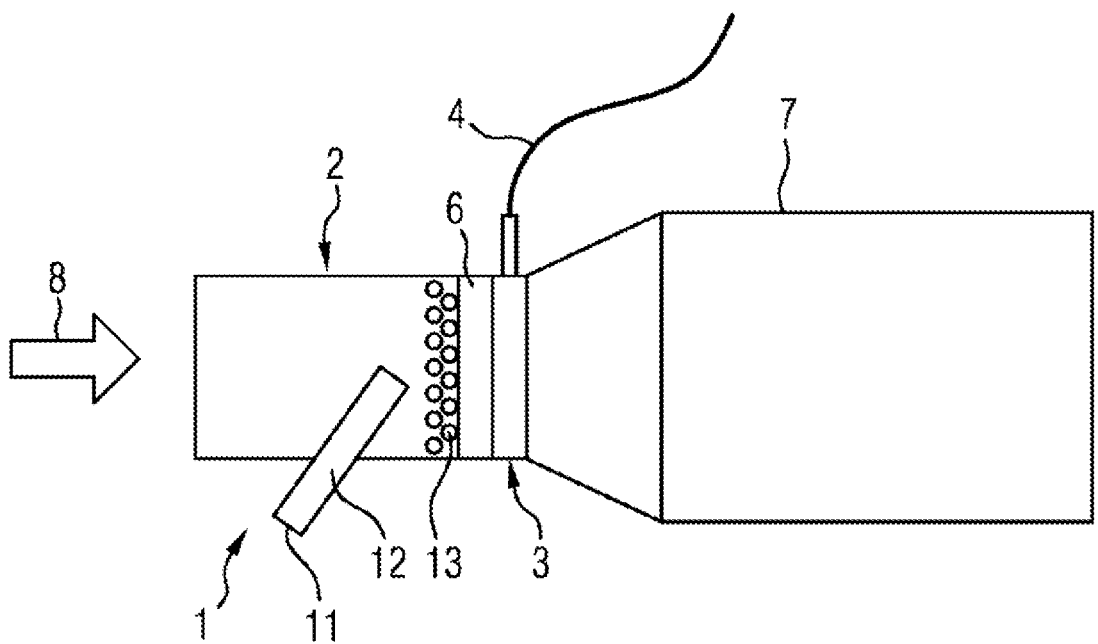
FIG. 4 shows a schematic view of a device having a heating catalytic converter, having a secondary air supply into a cavity of the catalytic converter, wherein the metal layers that form the supporting catalytic converter are perforated, and having a main catalytic converter.

FIG. 1, and also FIGS. 2 to 4, show(s) in each case a schematic view of a device according to the invention for treating exhaust gases. Corresponding components are therefore denoted by the same reference designations.

The Figures show a heating catalytic converter 1 which is formed from a catalytic converter 2 and a heating disk 3 located downstream in a flow direction 8 of the exhaust gas. A gap 6 is formed between the heating disk 3 and the catalytic converter 2. The heating disk 3 is connected via an indicated electrical contact 4 to a voltage source, such that the heating disk may be electrically heated.

Located downstream of the heating catalytic converter 1 in the flow direction 8 is a catalytic converter referred to as main catalytic converter 7, which is representative of one or more further catalytic converters for exhaust-gas aftertreatment. These may for example be oxidation catalytic converters, SCR catalytic converters, NH3 slip catalytic converters or even filter elements.

Secondary air, that is to say air from the surroundings, may be supplied into the gap 6 via the secondary air supply 5. FIG. 1 illustrates a supply at only one location directly into the gap 6.

By contrast to FIG. 1, FIG. 2 shows a supply of the secondary air at multiple locations into the gap 6. For this purpose, an annular structure 9 is arranged around the region of the gap 6, through which annular structure secondary air may flow, wherein the secondary air flows around the heating catalytic converter 1 and flow into the gap 6 through openings 10. This supply of the secondary air at multiple locations simultaneously is an example.

FIG. 3 shows an alternative form of the supply of the secondary air. The catalytic converter 2 has a cavity 12 which may be formed for example by cutouts in the metal layers that form the honeycomb body. Into this cavity 12, secondary air is fed directly into the cavity 12 via the secondary air supply 11. The secondary air is distributed from there via the flow channels, which are intersected by the cavity 12, of the catalytic converter 2.

FIG. 4 shows a construction according to FIG. 3. In addition, the metal layers that form the catalytic converter 2 have perforations 13, which allow a transfer flow of the exhaust gas-secondary air mixture between the flow channels of the catalytic converter 2 and thus allow a more homogeneous distribution.

The different features of the individual exemplary embodiments may also be combined with one another. The exemplary embodiments in FIGS. 1 to 4 are not of a limiting nature and serve for illustrating the concept of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device for the aftertreatment of exhaust gases from an exhaust-gas source, comprising:
    a spatially delimited flow path through which flow can pass proceeding from the exhaust-gas source;
    a heating catalytic converter which is arranged in the flow path, the heating catalytic converter further comprising:
        a catalytically active catalytic converter through which flow may pass, the catalytically active converter further comprising a metallic honeycomb body;
        an electrically heatable heating disk arranged downstream in a flow direction from the catalytically active catalytic converter;
    a secondary air supply, at least one outlet of the secondary air supply at least partially arranged in at least one cavity formed in the metallic honeycomb body in the region of the heating catalytic converter such that a gas flow referred to as secondary air is fed into the flow path in the region of the heating catalytic converter;
    wherein the metallic honeycomb body further comprises corrugated layers and smooth layers downstream of the at least one cavity in the flow direction, wherein the corrugated layers and smooth layers are of perforated form.

2. The device of claim 1, wherein the catalytic converter further comprising a supporting catalytic converter, wherein the heating disk is mechanically connected to the supporting catalytic converter.

3. The device of claim 1, wherein the secondary air is fed into the flow path between the catalytic converter and the heating disk.

4. The device of claim 1, wherein the secondary air supply further comprising multiple feed points.

5. The device of claim 1, further comprising a heating conductor arranged in the heating disk such that the heating conductor generates one or more local temperature maxima, and the positions of the temperature maxima on the heating disk correlate with the positions of flow maxima of the secondary air that is generated as a result of the feed of the secondary air.

6. The device of claim 1, wherein the honeycomb body of the catalytic converter further comprising:
    an adsorbent coating, the honeycomb body of the catalytic converter is coated with the adsorbent coating from an inflow side to the at least one cavity in the flow direction; and
    an oxidizing coating, the honeycomb body is coated with the oxidizing coating from the at least one cavity to an outflow side.

7. The device of claim 1, wherein the cavity is arranged in a region between the center and the outflow side of the catalytic converter in the flow direction.

8. The device of claim 1, wherein the corrugated layers and smooth layers further comprising expanded metal downstream of the at least one cavity in the flow direction.

* * * * *